May 6, 1952     C. E. WIEGAND     2,595,622
FISSION INDICATOR
Filed Sept. 12, 1949
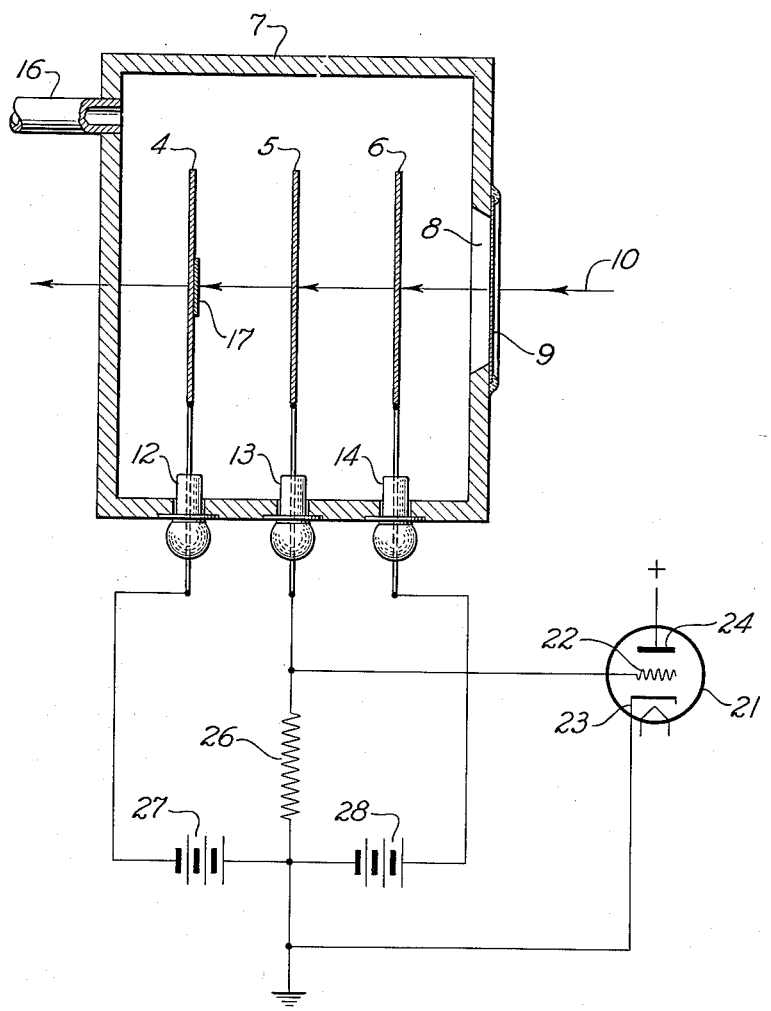
INVENTOR.
CLYDE E. WIEGAND
BY
Roland A. Anderson
ATTORNEY.

Patented May 6, 1952

2,595,622

UNITED STATES PATENT OFFICE 2,595,622

FISSION INDICATOR

Clyde E. Wiegand, Oakland, Calif., assignor to the United States of America as represented by the United States Atomic Energy Commission Application September 12, 1949, Serial No. 115,234

6 Claims. (Cl. 250—83.6)

The present invention relates to a method and means of detecting and indicating the phenomenon of nuclear fission and is particularly concerned with the measurement of fission cross sections.

Within the past few years the problem of releasing and harnessing the tremendous binding energies of atomic nuclei has received considerable attention and has been the object of intense research. The partial success that has been realized in solving this problem has aroused widespread interest and has caused an even greater effort to be expended in an attempt to reduce the present knowledge to a practical advantage and to acquire more essential knowledge in the field. These efforts have been in part hampered by lack of readily applicable techniques and instruments with which to carry on basic experiments in this little understood field.

It has been determined that energy is released by the breaking-up of atomic nuclei. This breaking up has been termed "fission" when it results in the production of two main fragments of approximately equal size from one nucleus. Fission may be natural, as in the case of certain rare elements, or may be artificially produced by the bombardment of more common elements with high energy particles. The probability of a process such as fission occurring under any particular circumstance is designated by the term "cross section" which is generally expressed in units of "barns," and the term "cross section" is taken as having this meaning in the following disclosure.

A multitude of new apparatus has been developed in order to study atomic structure and to utilize the results of this study. Numerous types of particle accelerators have been built to provide the ammunition with which to bombard nuclei, and of course much work has been done in an effort to develop instruments capable of recording and indicating the results obtained from such bombardment. With regard to fission processes in particular, difficulty has been experienced in detecting neutrons and also in detecting fission produced by charged particles. Neutron counters are known in the art, as is evidenced by the patent to Shoupp, No. 2,408,230; however, this type of counter has the disadvantage of being triggered by charged particles which tends to mask the signals produced by fission fragments. The solution of this problem is of vital importance to the art, and the provision of an instrument having the requisite capabilities greatly simplifies the difficulties attendant particular lines of atomic research at the present time.

Accordingly, the present invention has for an object the indication of nuclear fission.

Another object of the present invention is the provision of an improved method and means for indicating fission produced by charged particles.

Another object of the present invention is the provision of an improved method and means for determining fission cross sections.

Still another object of the present invention is to provide an improved method and means of indicating ionization caused by fission fragments to the exclusion of ionization caused by charged particles producing the fission.

The manner in which the foregoing objects are accomplished will become apparent from the following description taken in connection with the accompanying drawing, in which the sole figure represents a sectional view of the indicating chamber and associated elements with an appropriate electrical circuit connected thereto.

Referring to the figure, it may be noted that the invention in general comprises three electrodes 4, 5, and 6, two potential supply means 27 and 28 impressing equal and opposite potentials between the center electrode 5 and the two outer electrodes 4 and 6, and a circuit connected to indicate the current flowing from the center electrode 5 to ground. By this means the ionization produced by charged particles passing through the apparatus is balanced out, and only the ionization produced by fission fragments from a target mounted on one of the outer electrodes 4 is indicated by the electrical circuit.

Considering the figure in more detail, it is to be noted that the chamber 7 comprises a gastight enclosure which has an opening 8 formed in one wall thereof. This opening is covered by a thin diaphragm 9 which is secured to the chamber wall in any suitable manner, whereby a gas-tight connection is maintained. The diaphragm 9 is preferably quite thin so as to admit the passage of a beam of charged particles therethrough depicted by line 10 in the drawing. Internal to the chamber 7 are situated three electrodes 4, 5, and 6 mounted on members 12, 13, and 14 respectively which extend through the bottom of the chamber and are connected thereto by any suitable manner such as soldering in order to render the connections gas-tight. The members 12, 13, and 14 preferably comprise an insulating portion surrounding an electrical conductor and may be of the Kovar glass seal type.

The external nonconducting portion of the members is secured to the chamber in gas-tight connection, and the internal conducting portion of the members connects to the individual electrodes and extends outside the chamber, thereby enabling the electrodes to be maintained in insulated relationship with the chamber while being connected through the medium of the members 12, 13, and 14 to an external electrical circuit. One further opening is provided in the chamber 7 to accommodate a pipe or tube 16 which connects the interior of the chamber to a gas system, not shown. It will of course be appreciated that the proper pressure may be maintained in the chamber either by providing an external source of gas communicating with the chamber by a pipe 16 or by initially providing the proper pressure within the chamber and then sealing off the chamber. The atmosphere within the chamber 7 may advantageously comprise a noble gas in order to minimize undesirable reactions within the chamber, and the pressure of the gas within the chamber may be advantageously maintained above atmospheric pressure for reasons set forth below.

Considering the internal arrangement of the chamber 7, it is to be noted that the electrodes 4, 5, and 6 are preferably of a plate-like configuration, and that they are mounted in parallel relationship with equal spacing between adjacent electrodes. The electrodes are also mounted in line with the opening 8 in the chamber wall and substantially parallel to this wall of the chamber, so that a beam of particles 10 entering the chamber through opening 8 is substantially normal to the electrodes and passes through the approximate center of the electrodes. The diaphragm 9 and the electrodes 4, 5, and 6 are made sufficiently thin and of a suitable metal so that they do not impede the passage of the beam of particles. If a high energy beam is used, the material and thickness of these elements is of small importance as less than an inch of any of the common metals will not materially affect the beam; however, if a low energy beam is to be operated upon the use of one of the lighter metals is preferable. These elements may be advantageously made of aluminum or brass which is easily formed and has a low capture cross section.

A target 17 is mounted in any suitable manner in the approximate center of the electrode 4. Thus the target 17 is disposed in the path of the beam of charged particles 10 in such a position that a beam of charged particles entering the chamber 7 through the window 9 must first pass through the two electrodes 5 and 6 before striking the target 17. The target is formed of a fissionable material, and for certain applications of the invention may be advantageously secured to the electrode 4 by means admitting of facile removal such as clamps, while in other applications not necessitating removal of the target it may be secured to the electrode 4 in a more permanent fashion.

Equal and opposite potentials are impressed upon electrodes 4 and 6, and electrode 5 is electrically grounded. This may be conveniently accomplished by potential supply means external to the chamber 7. As illustrated in the drawing, the center electrode 5 is grounded through a resistor 26, and the electrodes 4 and 6 are connected through batteries 27 and 28 respectively to the juncture of the resistor 26 and ground. With the connections as shown, the center electrode 5 is initially at ground potential, electrode 4 is negatively charged with respect to the center electrode 5, and electrode 6 is positively charged with respect to the center electrode 5. The resistor 26 is included in the above circuit in order to provide a signal which may be conveniently utilized to indicate fission of the target 17, as is explained in more detail below. Any suitable indicating circuit may be employed in connection with the above chamber, and there is illustrated only a vacuum tube 21 connected with the resistor 26 between the grid 22 and cathode 23 thereof. In the illustrated embodiment a current passing through resistor 26 will lower the potential of the grid 22, thereby driving the tube to cut-off and thus raising the potential of the anode 24, which may be utilized in connection with a conventional recording or counting circuit (not shown).

Considering the operation of the device, it is first to be noted that the chamber 7 contains an ionizable atmosphere which may comprise any suitable gas or vapor as noted above, and equal and opposite potentials are impressed on electrodes 4 and 6 with center electrode 5 being maintained at ground potential. The chamber 7 is disposed in a beam of high energy charged particles designated by the line 10 in the drawing and is so oriented that the beam enters the chamber 7 through the thin window 9. The beam of charged particles passing through the chamber causes ionization in the region between electrodes 4 and 5 and between electrodes 5 and 6. As the potential difference and spacing between adjacent electrodes are equal, the same amount of ionization occurs in each of these regions. Electrode 6 is positively charged with respect to electrode 5, and thus ionization in the region between these electrodes results in electrons being attracted to the outer electrode 6 and positive ions being attracted to center elecrode 5. Electrode 4 is negatively charged with respect to electrode 5, and thus ionization in the region therebetween results in electrons being attracted to the center electrode 5 and positive ions are attracted to the outer electrode 4. Considering only ionization produced by the beam of charged particles, it will be apparent that an equal amount of ionization will occur on each side of the center electrode 5 and that therefore the electron equilibrium of electrode 5 remains undisturbed, while electrode 6 collects a surplusage of electrons and electrode 4 has a dearth of electrons (or a surplus of positive ions). This causes a current to flow in the external circuit of the apparatus between the electrodes 4 and 6; however, no current flows through the resistor 26 because of the balancing effect noted above. Fission of the target 17 by the beam of charged particles 10 causes fission fragments of the target material to be thrown into the region between electrodes 4 and 5. These fragments cause ionization of the atmosphere between electrodes 4 and 5; and thus the chamber is unbalanced, i. e., more ionization occurs between electrodes 4 and 5 than between electrodes 5 and 6. This causes a surplus of electrons to collect on the electrode 5 and to flow through the resistor 26 to ground. The result of this current flow through the resistor is to apply a negative potential to the grid 22 of the vacuum tube 21 and thus cut off the tube, which may be connected to actuate any suitable indicating or recording apparatus.

From the foregoing, it will be apparent that ionization caused by charged particles entering the chamber is balanced out and that only ionization resulting from fission of the target 17 causes signals to pass through resistor 26 and actuate the indicating means. Of course, the apparatus will also indicate fission caused by other means, such as neutron bombardment. However, the apparatus is particularly advantageous when used with charged particles as the ionization caused by the charged particles is effectively eliminated from the indicating portion of the circuit without the use of extensive and complicated equipment.

It will, of course, be appreciated that the ionizing potential of a fission fragment is many times that of a charged particle such as a proton; however, the probability of fission by a single charged particle is very small and thus a much larger number of charged particles are present. Therefore, the total ionization caused by the charged particles and by the fission fragments is of the same order of magnitude, and thus it is essential to remove or cancel out the effects of ionization by charged particles in order to be able to properly count or indicate the ionization caused by fission fragments.

The amount of ionization caused by any particular particle or fragment depends upon the amount of energy lost by the particle or fragment in the ionizable atmosphere and thus it is advantageous to maintain the pressure within the chamber greater than atmospheric pressure in order that the particles or fragments will lose the majority of their energy in the gas rather than in the electrodes. It may be further noted that fission of an atomic nucleus results in the splitting of the nucleus into two main fragments and that as these fragments are thrown apart in opposite directions only one fragment travels in the direction of the center electrode 5. Consequently, each pulse from the center electrode is indicative of one fission process.

That the present invention has many advantages and applications will be apparent from the above description. For example, with the use of a proper target material the apparatus is capable of indicating neutrons in the presence of charged particles, as ionization caused by the charged particles is balanced out, and only ionization resulting from neutron produced fission is indicated. The apparatus may also be utilized to determine the energy distribution of a beam of charged particles by the use of different target materials of known fission energy thresholds. Another application of the invention is in the determination of fission cross sections or probability of fission, which may be accomplished by the use of beams comprised of particles having substantially the same energy. These fission cross sections may be determined under a variety of conditions by employing different target materials and beams of different energies. It is thus to be noted that the invention clearly fulfills the objects set forth above as well as many other subsidiary objects and now makes possible the indication of fission process by charged particles without requiring extensive equipment to overcome ionization caused by the charged particles.

While the present invention has been disclosed in only one particular embodiment, it will be apparent to those skilled in the art that numerous modifications and variations are possible within the spirit and scope of the invention, and thus it is not intended to limit the invention to the details shown except as defined in the following claims.

What is claimed is:

1. A fission indicator comprising an envelope containing an ionizable atmosphere, a pair of electrodes disposed within said envelope, a center electrode disposed intermediate said pair of electrodes and equidistant therefrom, one of said pair of electrodes comprising a fissionable material, potential supply means grounding said center electrode and impressing equal and opposite potentials upon the electrodes of said pair of electrodes, and indicating means connected to said center electrode whereby ionization produced by fission of said fissionable material is indicated.

2. A fission indicator comprising an envelope containing an ionizable atmosphere, first and second electrodes disposed within said envelope in generally parallel relationship, said second electrode comprising a fissionable material, a third electrode disposed generally parallel to and intermediate said first and second electrodes and spaced equidistant from each, potential supply means interconnecting said electrodes and maintaining the potential difference between said first and third electrodes equal in value and sign to the potential difference between said third and second electrodes, and indicating means connected to said third electrode, thereby indicating fission of said second electrode.

3. A fission indicator comprising an envelope containing an ionizable atmosphere, first and second electrodes disposed in generally parallel relationship within said envelope, a target of fissionable material secured to the inner surface of said second electrode, a third electrode disposed intermediate and equidistant from said first and second electrodes and in generally parallel relationship thereto, potential supply means interconnecting said electrodes and maintaining a potential difference therebetween, the potential difference between said first and third electrodes being equal in value and opposite in sign to the potential difference between said third and second electrodes, and indicating means joined to said third electrode whereby fission within said envelope is indicated.

4. A fission indicator comprising an envelope pervious to charged particles and containing an ionizable atmosphere, a first electrode disposed within said envelope and insulated therefrom, second and third electrodes disposed within said envelope in insulated relation thereto and substantially parallel to said first electrode, said second and third electrodes being disposed on opposite sides of said first electrode and equispaced therefrom, a target of fissionable material mounted upon the face of said second electrode nearest said first electrode, all of said electrodes being pervious to charged particles, grounded potential supply means impressing equal and opposite potentials to said second and third electrodes, a resistor electrically grounding said first electrode, and indicating means connected across said resistor for indicating current pulses therethrough as a measure of fission of said target.

5. A fission indicator comprising an envelope containing an ionizable atmosphere, said envelope having an opening in a wall thereof, a thin window covering said opening, means sealing said window to said envelope in gastight relationship, a plurality of electrodes disposed within said envelope substantially parallel to said window and aligned therewith, said plurality of electrodes including an intermediate electrode and a pair of outer electrodes, said intermediate electrode being spaced equidistant from said outer electrodes, said electrodes and said window being pervious to charged particles, a target of fissionable material mounted upon the outer electrode farthest from said window on the face of said electrode nearest said window, potential supply means impressing equal and opposite potentials upon said outer electrodes and ground potential upon said center electrode, and indicating means connected to said center electrode, thereby indicating the current flowing in the circuit thereof.

6. A fission indicator comprising an envelope containing an ionizable atmosphere, a plurality of parallel spaced electrodes disposed internal to said envelope in insulated relationship thereto, said plurality of electrodes comprising at least a center electrode and two outer electrodes, a target of fissionable material attached to one of said outer electrodes upon the face thereof adjacent said center electrode, said envelope and said electrodes being pervious to atomic particles, an electrically grounded resistor connected to said center electrode, power supply means connected between each of said outer electrodes and ground and impressing equal and opposite potentials upon said outer electrodes, and indicating means connected across said resistor, thereby indicating fission of said target by atomic particles.

CLYDE E. WIEGAND.

REFERENCES CITED

The following references are of record in the file of this patent:

UNITED STATES PATENTS

| Number | Name | Date |
|---|---|---|
| 2,288,718 | Kallmann et al. | July 7, 1942 |
| 2,440,167 | Broxon et al. | Apr. 20, 1948 |
| 2,481,964 | Wollan | Sept. 13, 1949 |